US012597764B2

(12) United States Patent
Jurczak et al.

(10) Patent No.: US 12,597,764 B2
(45) Date of Patent: Apr. 7, 2026

(54) SAFETY TEST CIRCUIT AND METHOD

(71) Applicant: Rockwell Automation Technologies, Inc., Mayfield Heights, OH (US)

(72) Inventors: Wojciech Maciej Jurczak, Czerwionka-Leszczyny (PL); Daniel Marcin Strzelecki, Mikołów (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 129 days.

(21) Appl. No.: 18/545,498

(22) Filed: Dec. 19, 2023

(65) Prior Publication Data

US 2025/0202216 A1      Jun. 19, 2025

(51) Int. Cl.
H02H 1/00          (2006.01)
H02H 1/06          (2006.01)
H02H 3/02          (2006.01)

(52) U.S. Cl.
CPC ............ H02H 1/0007 (2013.01); H02H 1/06 (2013.01); H02H 3/02 (2013.01)

(58) Field of Classification Search
CPC .......... H02H 1/0007; H02H 1/06; H02H 3/02; H02H 3/044; G01R 31/3277
See application file for complete search history.

(56) References Cited

U.S. PATENT DOCUMENTS

| | | | | | |
|---|---|---|---|---|---|
| 7,633,771 | B2 * | 12/2009 | Sack | ................... | H02M 5/4585 |
| | | | | | 363/125 |
| 8,339,084 | B2 * | 12/2012 | Welchko | ............. | H02P 29/0241 |
| | | | | | 318/438 |
| 10,054,646 | B2 * | 8/2018 | Jouper | ................. | G11C 29/702 |
| 11,114,842 | B1 * | 9/2021 | Zhang | ................. | H02H 1/0007 |
| 2015/0084404 | A1 | 3/2015 | Hashim et al. | | |
| 2023/0179096 | A1 | 6/2023 | Boeke | | |
| 2024/0048062 | A1 | 2/2024 | Huang et al. | | |

FOREIGN PATENT DOCUMENTS

| | | | | | |
|---|---|---|---|---|---|
| CN | 104868757 | B | * | 5/2017 | |
| CN | 111239642 | A | * | 6/2020 | |
| EP | 3007293 | A1 | * | 4/2016 | .............. H02P 27/08 |

OTHER PUBLICATIONS

Design Guide: TIDA-050063, High-Voltage Solid-State Relay Active Precharge Reference Design, Datasheet [online], Texas Instruments, 2023. Retrieved from the Internet: <URL:https://www.ti.com/lit/pdf/tiduf21>, 20 pages.
Office Action issued by the USPTO in U.S. Appl. No. 18/486,473 on Aug. 18, 2025, 20 pages.

* cited by examiner

*Primary Examiner* — Danny Nguyen
*Assistant Examiner* — Samantha L Faubert

(57)          ABSTRACT

A safety test circuit includes a pulse test control circuit configured to receive a zero-vector signal and to generate a pulse test signal when the zero-vector signal is active, and first and second safety channels. The first safety channel includes a first enable circuit configured to receive the pulse test signal and a first safety input signal, and to generate a first enable signal which is active only when both the pulse test signal and the first safety input signal are inactive, and a first power signal gate configured to receive a first plurality of power control signals and to transfer the first plurality of power control signals to a power module only when the first enable signal is active. The second safety channel includes a second enable circuit configured similar to the first enable circuit, and a second power signal configured similar to the first power signal gate.

20 Claims, 7 Drawing Sheets

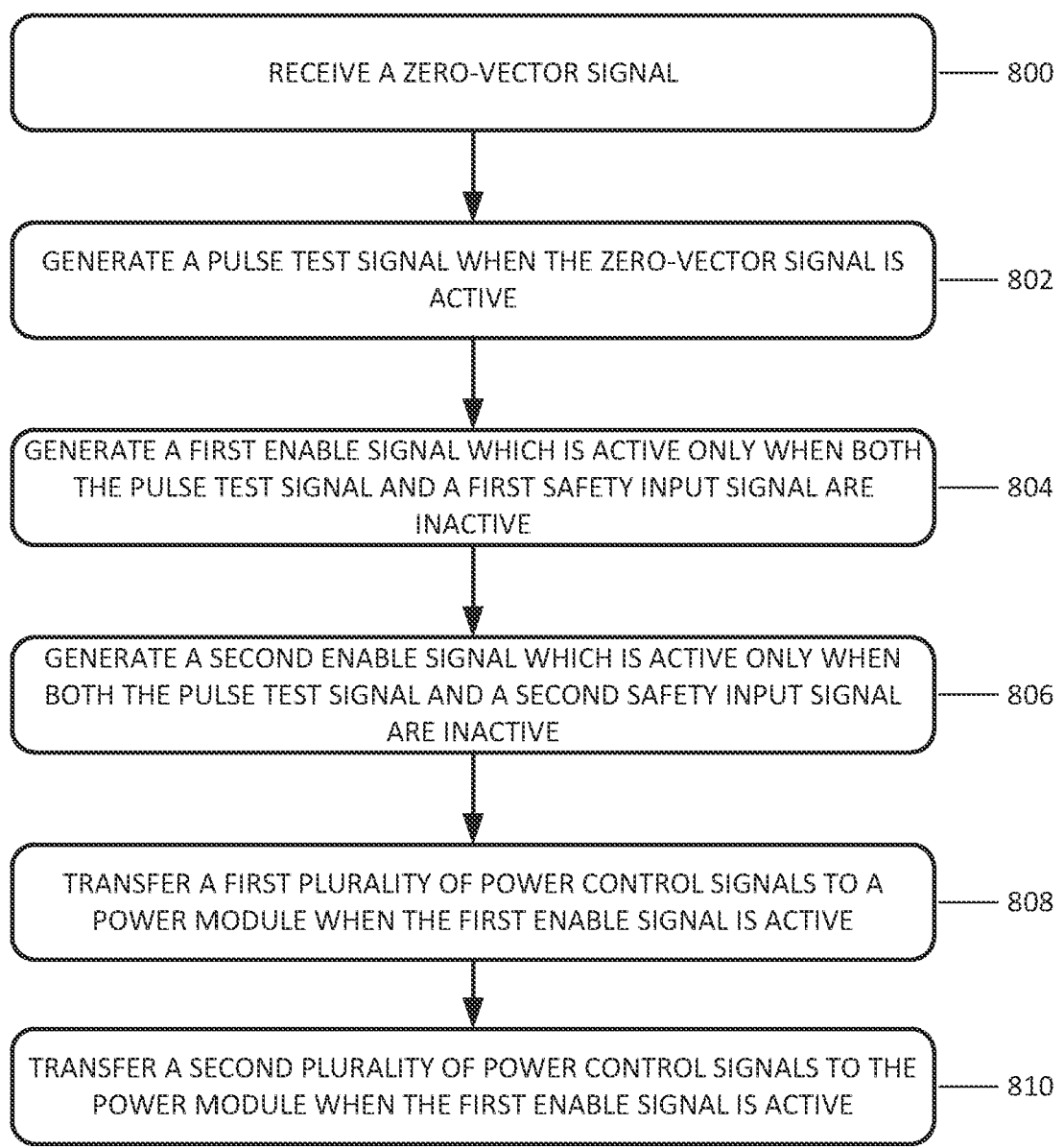

RECEIVE A ZERO-VECTOR SIGNAL — 800

GENERATE A PULSE TEST SIGNAL WHEN THE ZERO-VECTOR SIGNAL IS ACTIVE — 802

GENERATE A FIRST ENABLE SIGNAL WHICH IS ACTIVE ONLY WHEN BOTH THE PULSE TEST SIGNAL AND A FIRST SAFETY INPUT SIGNAL ARE INACTIVE — 804

GENERATE A SECOND ENABLE SIGNAL WHICH IS ACTIVE ONLY WHEN BOTH THE PULSE TEST SIGNAL AND A SECOND SAFETY INPUT SIGNAL ARE INACTIVE — 806

TRANSFER A FIRST PLURALITY OF POWER CONTROL SIGNALS TO A POWER MODULE WHEN THE FIRST ENABLE SIGNAL IS ACTIVE — 808

TRANSFER A SECOND PLURALITY OF POWER CONTROL SIGNALS TO THE POWER MODULE WHEN THE FIRST ENABLE SIGNAL IS ACTIVE — 810

FIG. 8

SAFETY TEST CIRCUIT AND METHOD

TECHNICAL BACKGROUND

In modern industrial environments, many large machines may be dangerous when operated incorrectly or when a fault occurs in the system causing a machine to behave in an abnormal manner. Safety functions (such as emergency stop buttons) are used to allow an operator to immediately shut down a machine. The safety functions are configured to activate one or more safety circuits within the controller, which in turn, immediately disable power to the machine, or otherwise immediately shut down the machine. Safety circuits vary widely in their design and operation, but all are configured to shut down the machine as quickly as possible. Also, controllers continuously monitor machine operation and immediately activate one or more safety circuit to shut down the machine when it is detected behaving in an abnormal manner.

Because these safety circuits are vital to the safe operation of industrial machines, they must be tested periodically during normal operation to ensure that the safety circuit is operating properly and will immediately shut down the machine when necessary. In some implementations, safety tests may impact the efficiency of the machine or its associated power supply since they must periodically occur during normal operation of the machine.

In order to increase the reliability of the safety function, two independent safety channels are provided in some safety circuits. Both channels have the same functionality and provide redundancy to the system.

The term "safety state" is the state that the machine goes into after releasing the safety function. The main purpose of all safety implementations is to maintain control of the machine's function. Fault detection is also required to check the ability of the system to control the safety function. Additional diagnostic blocks control the main function of the safety circuit and when faults are detected, put the system into a safety state.

In Variable-Frequency Drives (VFDs) the safety function is tested periodically by briefly turning off Pulse-Width Modulated (PWM) control signals. This diagnostic method is called "pulse testing" and may have a negative impact on the output signal, especially when the frequency of the pulse test is relatively similar to the PWM control signals' frequency.

SUMMARY

In an implementation, a safety test circuit includes a pulse test control circuit configured to receive a zero-vector signal and to generate a pulse test signal when the zero-vector signal is active, a first safety channel, and a second safety channel.

The first safety channel includes a first enable circuit configured to receive the pulse test signal and a first safety input signal, and to generate a first enable signal which is active only when both the pulse test signal and the first safety input signal are inactive, and a first power signal gate configured to receive a first plurality of power control signals and to transfer the first plurality of power control signals to a power module only when the first enable signal is active.

The second safety channel includes a second enable circuit configured to receive the pulse test signal and a second safety input signal, and to generate a second enable signal which is active only when both the pulse test signal and the second safety input signal are inactive, and a second power signal gate configured to receive a second plurality of power control signals and to transfer the second plurality of power control signals to the power module only when the second enable signal is active.

In another implementation, a method for testing a safety circuit includes receiving a zero-vector signal, generating a pulse test signal when the zero-vector signal is active. The method also includes generating a first enable signal which is active only when both the pulse test signal and a first safety input signal are inactive, and generating a second enable signal which is active only when the pulse test signal and a second safety input signal are inactive.

The method further includes transferring a first plurality of power control signals to a power module when the first enable signal is active, and transferring a second plurality of power control signals to the power module when the second enable signal is active.

BRIEF DESCRIPTION OF THE DRAWINGS

Many aspects of the disclosure may be better understood with reference to the following drawings. While several implementations are described in connection with these drawings, the disclosure is not limited to the implementations disclosed herein. On the contrary, the intent is to cover all alternatives, modifications, and equivalents.

FIG. 8 illustrates a flowchart of an example method for testing a safety circuit.

DETAILED DESCRIPTION

Figure 1:
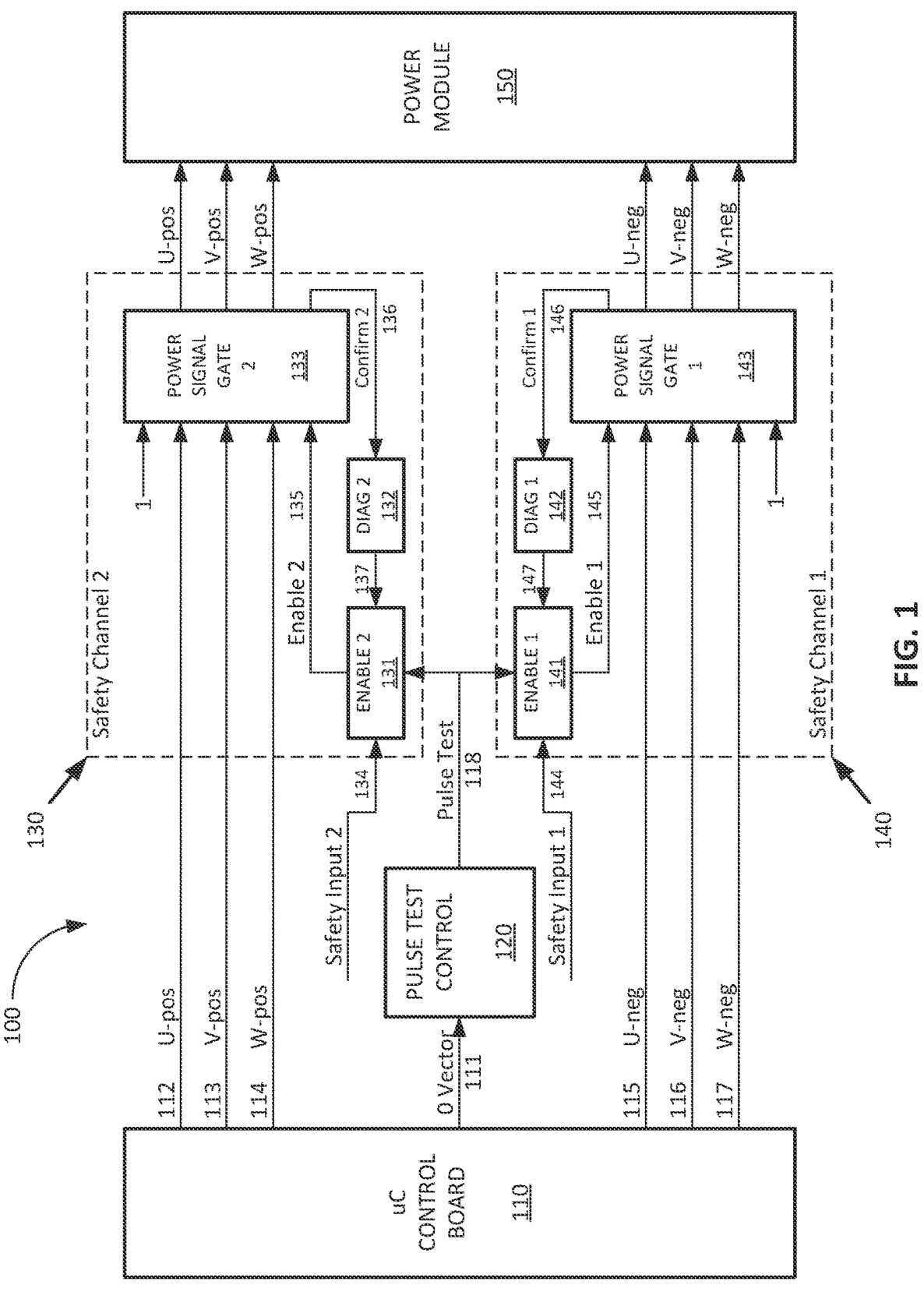
FIG. 1 illustrates an example power signal generation module including two safety test channels.

The following descriptions of various example embodiments and implementations of a system and method for the testing of safety circuits. As discussed above, industrial machines may become very dangerous when operated improperly or when they have a failure. These machines include various safety functions, for example, emergency stop buttons that allow an operator to immediately shut down the machine, and their controllers typically include monitoring systems that monitor machine parameters during operation and shut down the machine when any of the parameters indicate the possibility of a dangerous condition.

Since these safety circuits are so critical to the safe operation of industrial machines, industrial standards require the periodic testing of the safety circuits during normal operation. In some embodiments, safety circuits are implemented between a microcontroller that generates power control signals for a power module, and the power module.

The safety circuit interrupts or grounds these signals using a power signal gate when it receives a safety input.

To further increase reliability, some embodiments include two independent safety channels, each gating a portion of the power control signals, and configured such that when either safety channel is triggered, sufficient power control signals are interrupted or grounded that the power module shuts down. In some embodiments, each of the independent safety channels shut off all of the power control signals.

In some embodiments, to test the operation of the safety circuit, periodically an enable signal to the power signal gate is inactivated and the safety test circuit monitors one or more output of the power signal gate to ensure that the output is turned off when the enable signal is inactivated. Since these power control signals are inputs to a power module that provides power to an industrial machine, these tests temporarily shut off the power module for brief periods during normal operation.

Even though these test periods are brief, they still effect the efficiency of the power module and may degrade its normal operation. The impact of pulse testing on PWM signals increases as the PWM signal frequency increases, and the frequency of pulse testing approaches the frequency of the PWM control signals. To prevent this disruption of the power module, a safety test circuit is described herein that monitors the power control signals and conducts the safety tests during times when the power control signals are all inactive. This allows the safety tests to proceed during normal operation without having any effect on the power module since the tests occur during times when the power control signals are already inactive.

This solution for testing a safety circuit provides a technical advantage by performing testing of the safety circuit during normal operation without having any effect on the operation of the power module. This increases performance of the power module, and reduces stress on the power module.

FIG. 1 illustrates an example power signal generation module 100 including two safety test channels 130 and 140. In this example embodiment, microcontroller control board 110 generates power control signals U-pos 112, V-pos 113, W-pos 114, U-neg 115, V-neg 116, and W-neg 117. Microcontroller control board 110 also generates zero-vector signal 111 which is active when all the power control signals 112-117 are inactive. In some implementations, the zero-vector signal is generated by a logical NOR circuit. Pulse test control circuit 120 receives the zero-vector signal 111 and generates a pulse test signal 118 based at least in part on the zero-vector signal 111. Pulse test control circuit 120 also includes internal timers and processing circuitry to control generation of pulse test signal 118. During normal operation, the pulse test signal 118 is only activated when the zero-vector signal 111 is active.

In some embodiments, separate zero-vectors and pulse test signals may be generated independently for the first safety test channel 140 and the second safety test channel 130. In such a configuration, the zero-vectors are generated from the power control signals gated by the corresponding safety test channel.

During operation of a Variable-Frequency Drive (VFD) eight possible switching vectors for the inverter are generated. There are six active switching vectors and two zero-vectors. During active vectors, voltage is applied to the motor terminal and power from the inverter is transferred to the motor. Simultaneous switching on of all top or all bottom transistors results in no voltage across the motor terminals and no power in the motor. This moment of time is called a zero-vector. In an example embodiment, a safety test circuit includes a pulse test control circuit 120 that is synchronized with the PWM zero vector signal. Activation of the zero-vector causes the pulse test control circuit 120 to generate a diagnostic pulse test signal when the zero-vector signal is active. In some embodiments, there are two zero-vectors that appear alternately meaning that one (e.g., the bottom transistors are turned on) can be used to trigger the first safety channel, and the second one (e.g., the top transistors are turned on) will trigger the second safety channel.

Output power is delivered only when both channels are enabled. Each channel separately blocks both channels, providing double protection.

The pulse test signal 118 is used to initiate a test of the safety circuit in one or both of the safety channels 130 and 140. In this example embodiment, the safety circuit comprises enable inputs to power signal gate 1 143 and power signal gate 2 133. When the enable is disabled for any reason power signal gate 1 143 and power signal gate 2 133 stop sending their respective power control signals to power module 150, causing power module 150 to stop supplying power to its respective machine and shutting down the machine.

Since the pulse test signal 118 is active when all the power control signals 112-117 are inactive, the test of the safety circuit does not disrupt operation of power module 150. In some embodiments, it is possible that there are long periods of time when one or more of the power control signals 112-117 is active. In this case, pulse test control circuit 120 is configured to activate the pulse test signal 118 when the zero-vector signal has remained inactive for longer than a test threshold time period.

In this example embodiment, Safety Channel 1 140 gates power control signals U-neg 115, V-neg 116, and W-neg 117 and Safety Channel 2 130 gates power control signals U-pos 112, V-pos 113, and W-pos 114.

Power signal gate 1 143 is configured to transfer power control signals U-neg 115, V-neg 116, and W-neg 117 to power module 150 when enabled by the first enable signal 145. When the first enable signal 145 becomes inactive, power signal gate 1 143 interrupts or grounds power control signals U-neg 115, V-neg 116, and W-neg 117. In some example embodiments, power signal gate 1 143 comprises a plurality of logical AND gates, transfer gates, or the like.

Power signal gate 1 143 also receives a logical one (in this case a high signal, or tied to a power supply) at one of its inputs. This is used to test the proper operation of power signal gate 1 143. The output corresponding to the logical one input is first confirmation signal 146. This first confirmation signal 146 is monitored by pulse test diagnostic circuit 1 142. During testing, the first confirmation signal 146 should go to a logical zero when the first enable signal 145 is inactive. If this does not happen during each test, pulse test diagnostic circuit 1 142 sends a first error signal 147 to the first enable circuit 141. In some embodiments, the first enable circuit 141 is configured to shut down power module 150 when first error signal 147 is activated.

The first enable circuit 141 also receives safety input 1 144 and is configured to disable the first enable signal 145 when safety input 1 144 is activated. During normal operation, first enable circuit 141 periodically receives pulse test signals 118 and disables the first enable signal 145 in response to the pulse test signal 118. Pulse test diagnostic circuit 1 142 monitors the first confirmation signal 146 and transmits a first error signal 147 to the first enable circuit 141 if the first confirmation signal 146 does not track the first enable signal 145. Since the first confirmation signal 146 is the logical AND of the logical one and the first enable signal 145, the first confirmation signal 146 is identical to the first enable signal 145 only delayed by the delay time of the logical AND gate within power signal gate 1 143.

Power signal gate 2 133 is configured to transfer power control signals U-pos 112, V-pos 113, and W-pos 114 to power module 150 when enabled by the second enable signal 135. When the second enable signal 135 becomes inactive, power signal gate 2 133 interrupts or grounds power control signals U-pos 112, V-pos 113, and W-pos 114. In some example embodiments, power signal gate 2 133 comprises a plurality of logical AND gates, transfer gates, or the like.

Power signal gate 2 133 also receives a logical one (in this case a high signal, or tied to a power supply) at one of its inputs. This is used to test the proper operation of power signal gate 2 133. The output corresponding to the logical one input is the second confirmation signal 136. This second confirmation signal 136 is monitored by pulse test diagnostic circuit 2 132. During testing, the second confirmation signal 136 should go to a logical zero when the second enable signal 135 is inactive. If this does not happen during each test, pulse test diagnostic circuit 2 132 sends a second error signal 137 to the second enable circuit 131. In some embodiments, the second enable circuit 131 is configured to shut down power module 150 when second error signal 137 is activated.

The second enable circuit 131 also receives safety input 2 134 and is configured to disable the second enable signal 135 when safety input 2 134 is activated. During normal operation, second enable circuit 131 periodically receives pulse test signals 118 and disables the second enable signal 135 in response to the pulse test signal 118. Pulse test diagnostic circuit 2 132 monitors the second confirmation signal 136 and transmits a second error signal 137 to the second enable circuit 131 if the second confirmation signal 136 does not track the second enable signal 135. Since the second confirmation signal 136 is the logical AND of the logical one and the second enable signal 135, the second confirmation signal 136 is identical to the second enable signal 135 only delayed by the delay time of the logical AND gate within power signal gate 2 133.

Figure 2:
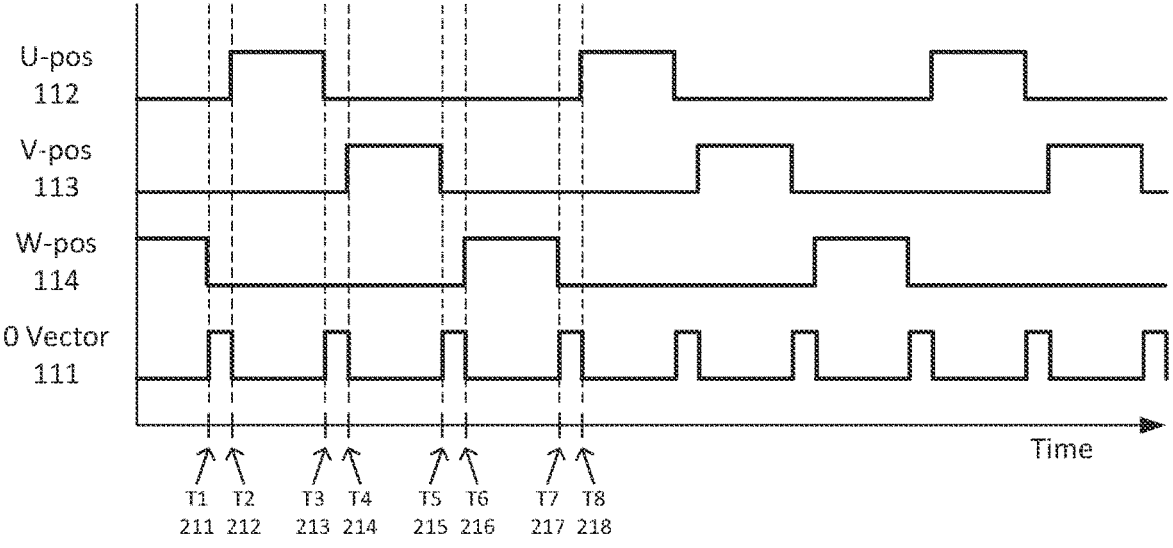
FIG. 2 illustrates a timing diagram of signals within an example embodiment of a power signal generation module.
Figure 7:
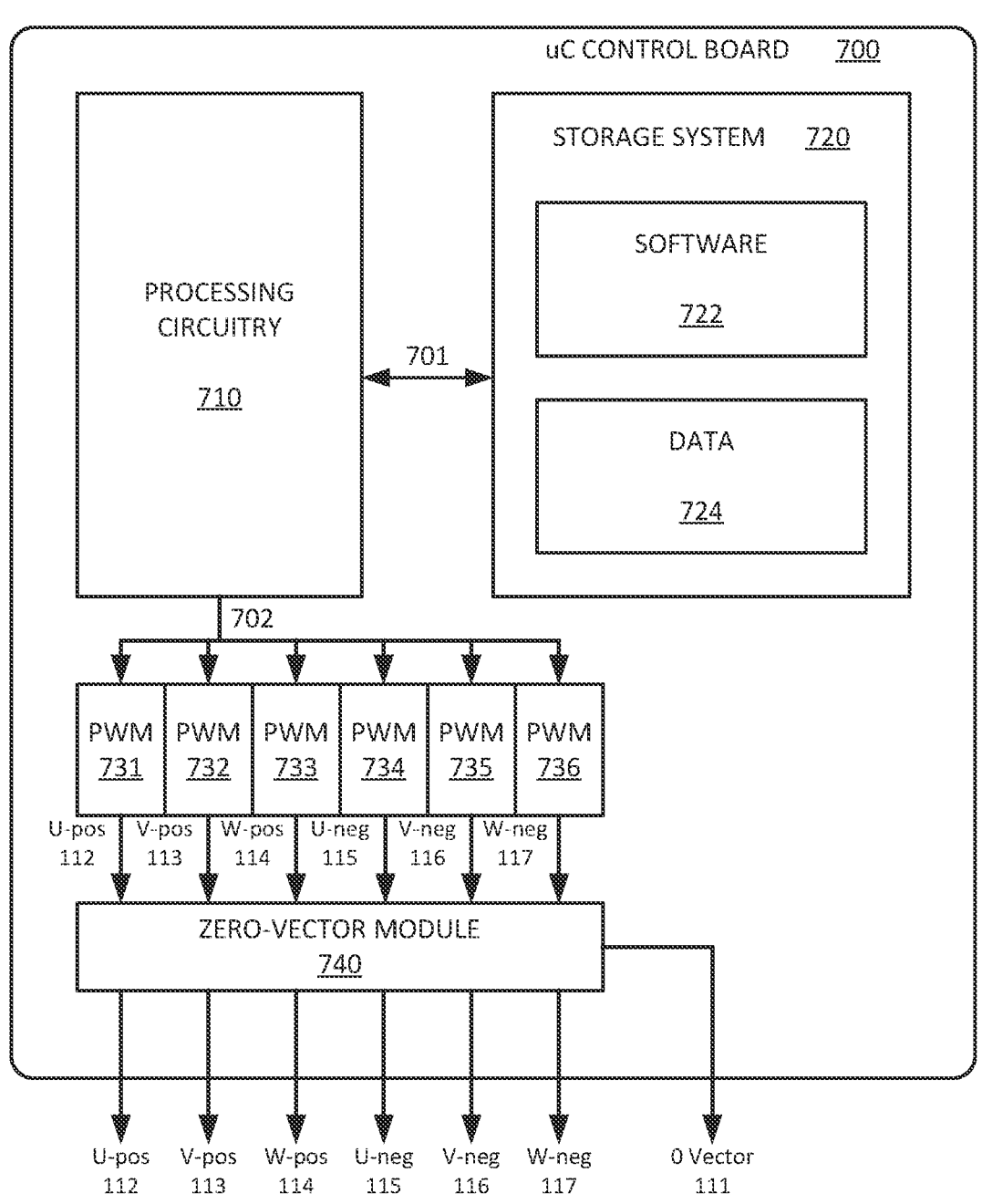
FIG. 7 illustrates an example block diagram of a microcontroller control board such as the microcontroller control board from FIG. 1.

FIG. 2 illustrates a timing diagram of signals within an example embodiment of a power signal generation module 100. In this example timing diagram, signals U-pos 112, V-pos 113, W-pos 114, and zero-vector 111 are illustrated. These signals are provided by microcontroller control board 110. Power control signals U-pos 112, V-pos 113, and W-pos 114 are generated by pulse width modulators within microcontroller control board 110. Zero-vector signal 111 is generated by a zero-vector module within microcontroller control board 110. Microcontroller control board 110, including its pulse width modulators and zero-vector module, is illustrated in FIG. 7 and described in detail below.

In this example embodiment, the zero-vector signal 111 is activated when power control signals U-pos 112, V-pos 113, and W-pos 114 are all inactive. Here, the zero-vector signal 111 is active between times T1 211 and T2 212, T3 213 and T4 214, T5 215 and T6 216, and T7 217 and T8 218. In this example embodiment, the zero-vector signal 111 is the logical NOR of power control signals U-pos 112, V-pos 113, and W-pos 114. Zero-vector signal 111 is high when the corresponding safety circuit may be tested by disabling the power control signals without affecting power module 150.

Figure 3:
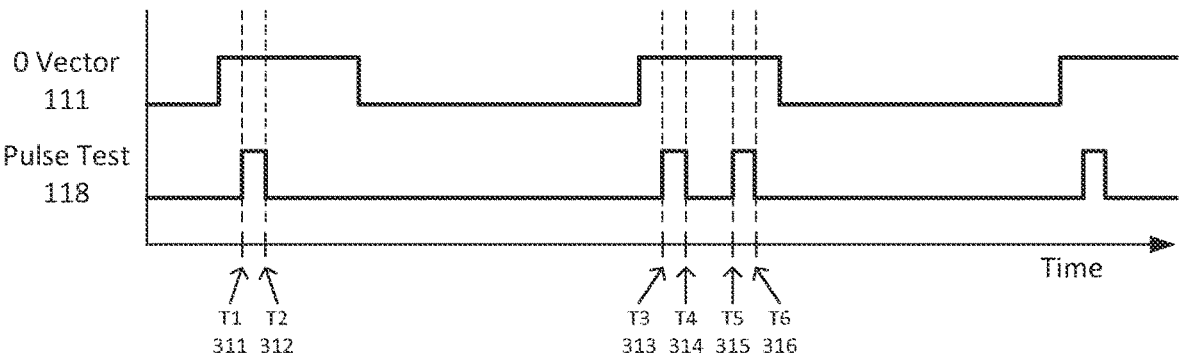
FIG. 3 illustrates a timing diagram of signals within an example embodiment of a power signal generation module.

FIG. 3 illustrates a timing diagram of signals within an example embodiment of a power signal generation module

100. In this example timing diagram, zero-vector signal 111 and pulse test 188 are illustrated.

In this example embodiment, pulse test control circuit 120 initiates tests of the safety circuit during times when zero-vector signal 111 is active. Here, pulse test signal 118 is active between times T1 311 and T2 312, T3 313 and T4 314, and T5 315 and T6 316. As described above with respect to FIG. 1, pulse test control circuit 120 receives the zero-vector signal 111 and generates a pulse test signal 118 based at least in part on the zero-vector signal 111. Pulse test control circuit 120 also includes internal timers and processing circuitry to control generation of pulse test signal 118. During normal operation, the pulse test signal 118 is only activated when the zero-vector signal 111 is active.

Figure 4:
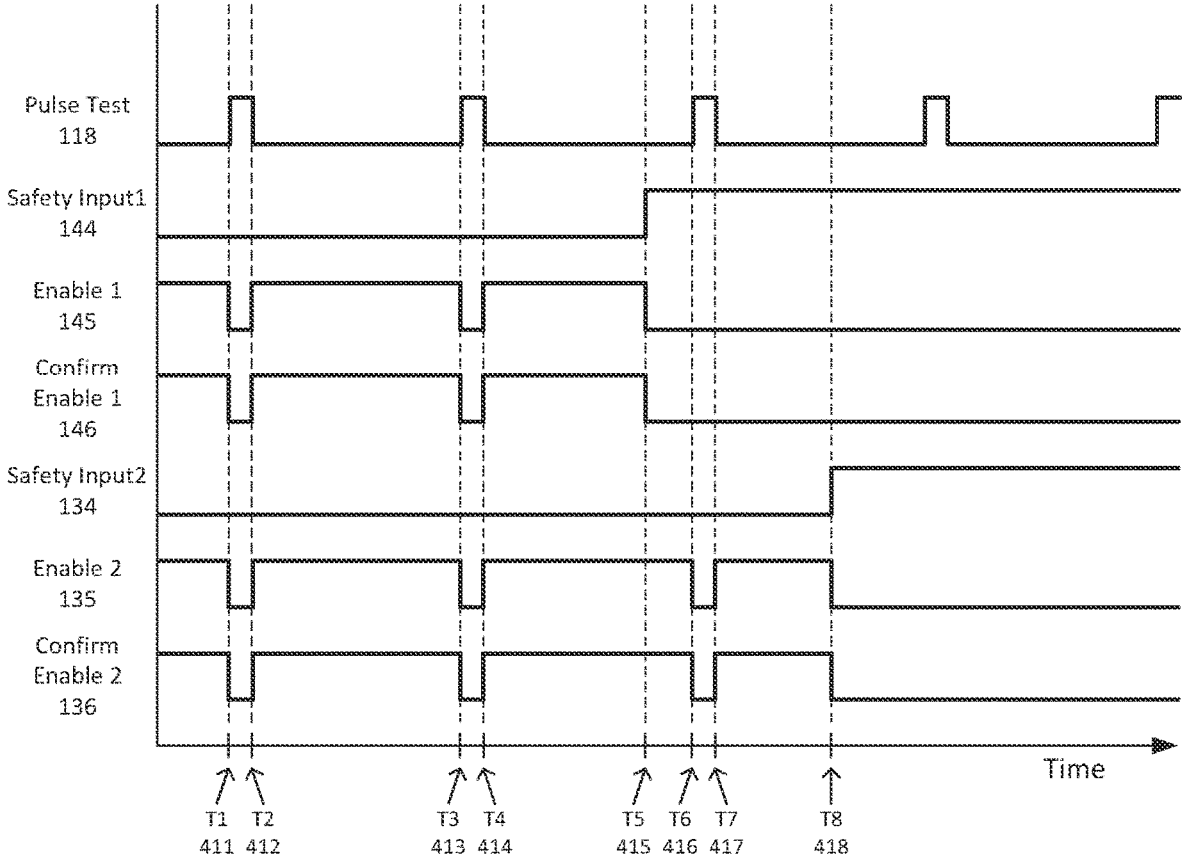
FIG. 4 illustrates a timing diagram of signals within an example embodiment of a power signal generation module.

FIG. 4 illustrates a timing diagram of signals within an example embodiment of a power signal generation module 100. In this example timing diagram, pulse test signal 118, safety input 1 144, first enable signal 145, first confirmation signal 146, safety input 2 134, second enable signal 135, and second confirmation signal 136 are illustrated.

In this example embodiment pulse test 118 is active between times T1 411 and T2 412, T3 413 and T4 414, and T6 416 and T7 417. In this example, safety input 1 144 is activated at time T5 415, such as in response to a user pushing an emergency stop button, and safety input 2 134 is activated at time T8 418, such as in response to the microcontroller control board 110 detecting a fault in the machine. The first enable signal 145 is inactivated during the first two pulse tests, and then is latched inactive at time T5 415 when safety input 1 144 is activated, in order to immediately shut down the machine in response to an actual fault signaled by safety input 1 144. The first confirmation signal 146 tracks the first enable signal 145, (with a slight delay as described above with respect to FIG. 1). The second enable signal 135 is inactivated during the first three pulse tests, and then is latched inactive at time T8 418 when safety input 2 134 is activated, in order to immediately shut down the machine in response to an actual fault signaled by safety input 2 134. In various implementations, safety input 1 144 and safety input 2 134 may be implemented as active high or active low.

Figure 5:
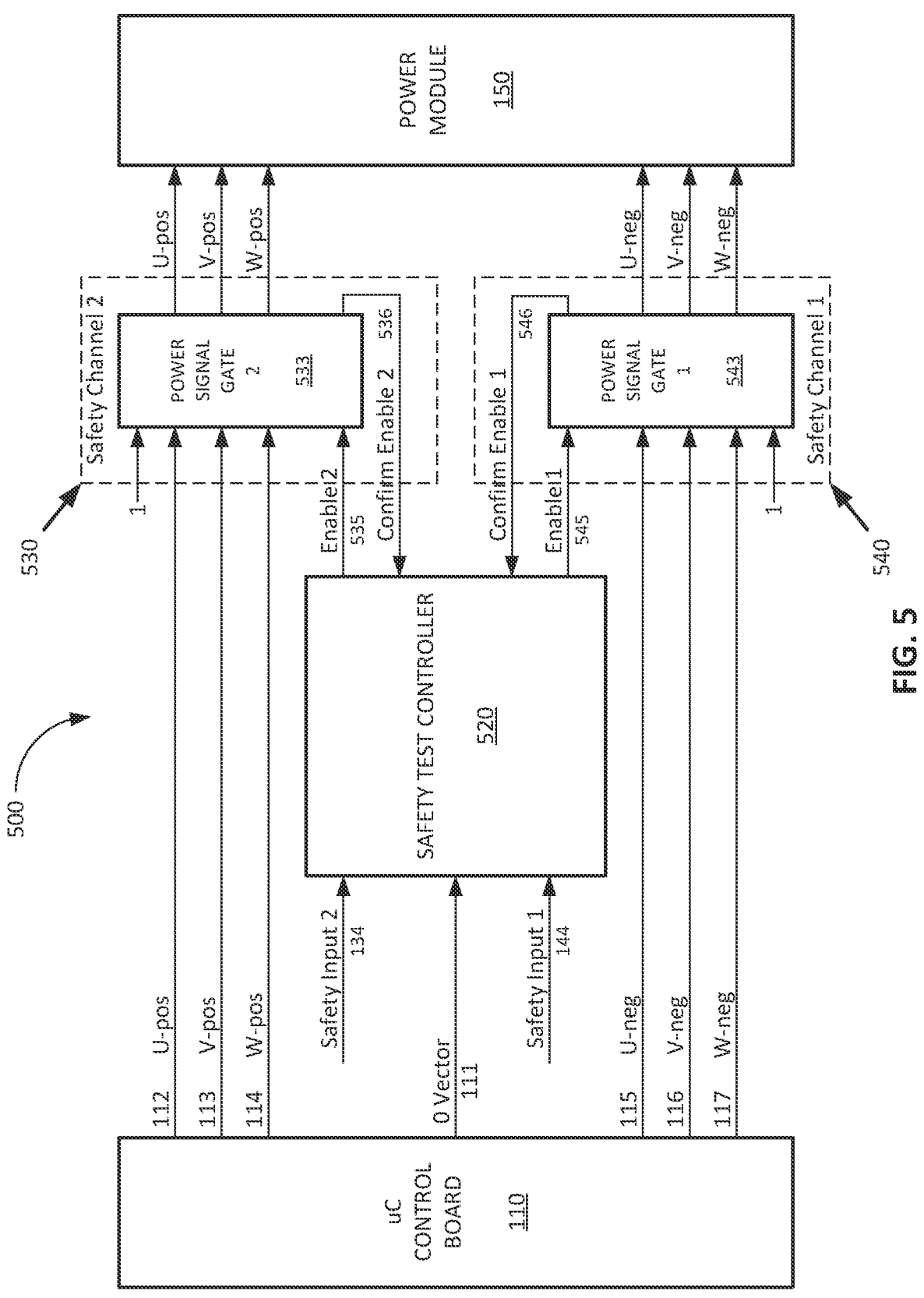
FIG. 5 illustrates an example power signal generation module including a safety test controller and two safety test channels.

FIG. 5 illustrates an example power signal generation module 500 including a safety test controller 520 two safety test channels 530 and 540. This example embodiment is an alternate configuration to the power signal generation module 100 of FIG. 1. It functions the same as the power signal generation module 100 of FIG. 1, however the functions of pulse test control circuit 120, first enable circuit 141, second enable circuit 131, pulse test diagnostic circuit 1 142, and pulse test diagnostic circuit 2 132 have been incorporated into a single safety test controller module 520.

Safety channel 1 540 includes power signal gate 1 543 along with first enable signal 545 and first confirmation signal 546. Safety channel 2 530 includes power signal gate 2 533 along with second enable signal 535 and second confirmation signal 536. This example embodiment is one of the many possible embodiments of the present invention and is illustrated here as a representative of one alternative embodiment. An example implementation of safety test controller 520 is illustrated in FIG. 6 and described below.

Figure 6:
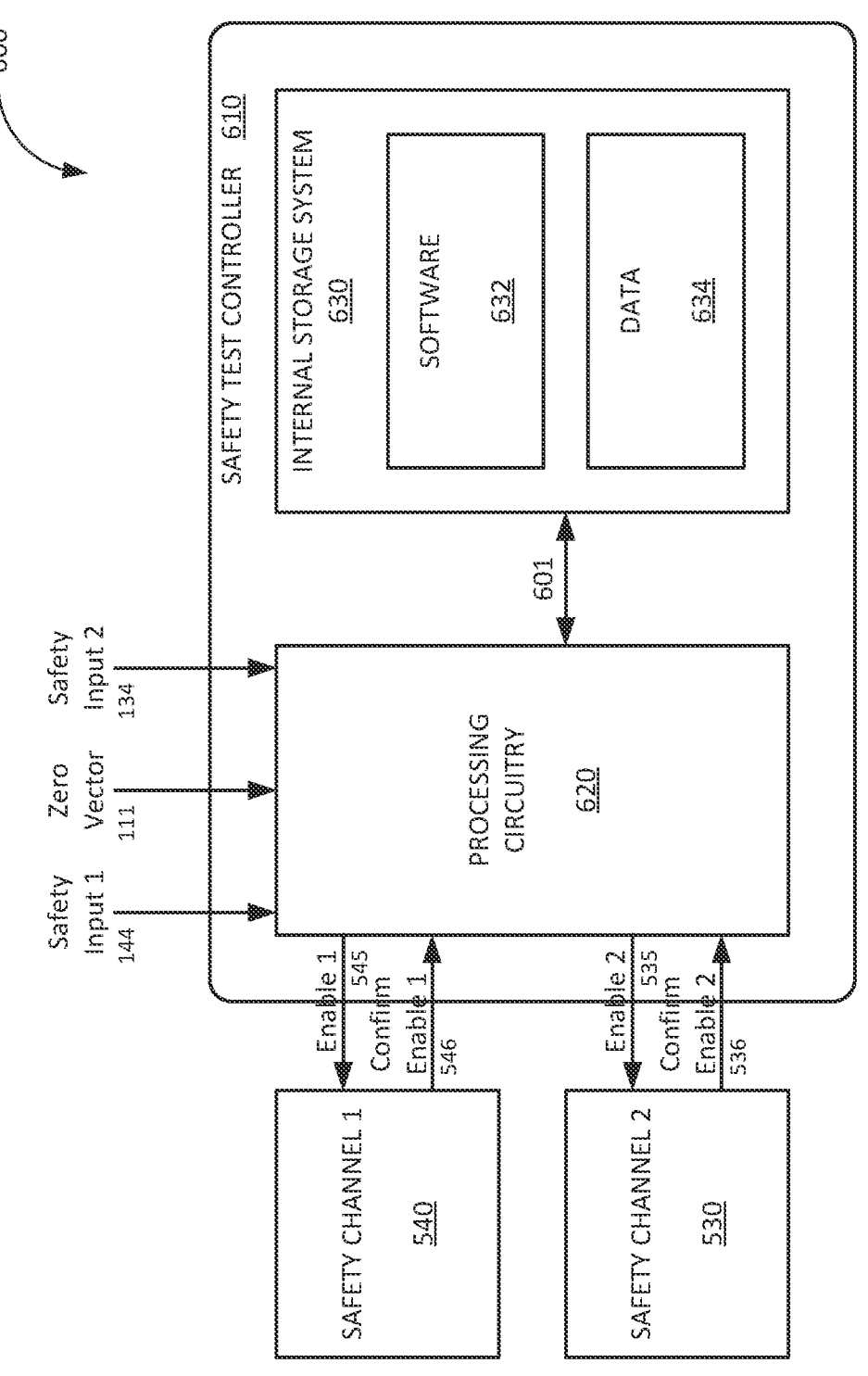
FIG. 6 illustrates an example block diagram of a safety test circuit including a safety test controller and two safety test channels.

FIG. 6 illustrates an example block diagram of a safety test circuit 600 including a safety test controller 610 (such as safety test controller 520 from FIG. 5) and two safety test channels (safety channel 1 540 and safety channel 2 530).

In this example embodiment, safety test controller 610 includes processing circuitry 620 and internal storage system 630. Processing circuitry 620 is coupled with internal storage system 630 through link 601. Processing circuitry 620 is configured to receive first confirmation signal 546 from safety channel 1 540 and to provide first enable signal 545 to safety channel 1 540. Processing circuitry 620 is also configured to receive second confirmation signal 536 from safety channel 2 530 and to provide second enable signal 535 to safety channel 2 530. Processing circuitry 620 is further configured to receive safety input 1 144, safety input 2 134, and zero-vector signal 111. Internal storage system 630 includes software 632 and data 634.

Processing circuitry 620 comprises electronic circuitry configured to test safety channel 1 540 and safety channel 2 530 by disabling the first enable signal 545 and the second enable signal 535, as described above with respect to FIG. 1 and FIG. 5. Processing circuitry 620 also comprises electronic circuitry configured to monitor the first confirmation signal 546 and the second confirmation signal 536 to verify the proper operation of safety circuitry within safety channel 1 540 and safety channel 2 530.

Processing circuitry 620 may comprise microprocessors and other circuitry that retrieves and executes software 632. Examples of processing circuitry 620 include general purpose central processing units, application specific processors, and logic devices, as well as any other type of processing device, combinations, or variations thereof. Processing circuitry 620 may be implemented within a single processing device, such as an application specific integrated circuit (ASIC), but may also be distributed across multiple processing devices or sub-systems that cooperate in executing program instructions.

Internal storage system 630 may comprise any non-transitory computer readable storage media capable of storing software 632 that is executable by processing circuitry 620. Internal storage system 630 may also include various data structures 634 which comprise one or more registers, databases, tables, lists, or other data structures. Storage system 630 may include volatile and nonvolatile, removable and non-removable media implemented in any method or technology for storage of information, such as computer readable instructions, data structures, program circuits, or other data.

Storage system 630 may be implemented as a single storage device but may also be implemented across multiple storage devices or sub-systems co-located or distributed relative to each other. Storage system 630 may comprise additional elements, such as a controller, capable of communicating with processing circuitry 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which may be used to store the desired information and that may be accessed by an instruction execution system, as well as any combination or variation thereof.

Software 632 may be implemented in program instructions and among other functions may, when executed by safety test controller 610 in general, or processing circuitry 620 in particular, direct safety test controller 610, or processing circuitry 620, to operate as described herein to test safety channel 1 540 and safety channel 2 530. Software 632 may include additional processes, programs, or components, such as operating system software, database software, or application software. Software 632 may also comprise firmware or some other form of machine-readable processing instructions executable by elements of processing circuitry 620.

In general, software 632 may, when loaded into processing circuitry 620 and executed, transform processing circuitry 620 overall from a general-purpose computing system into a special-purpose computing system customized to operate as described herein for a safety test controller 610 configured to test safety channel 1 540 and safety channel 2 530, among other operations. Encoding software 632 on internal storage system 630 may transform the physical structure of internal storage system 630. The specific transformation of the physical structure may depend on various factors in different implementations of this description. Examples of such factors may include, but are not limited to the technology used to implement the storage media of internal storage system 630 and whether the computer-storage media are characterized as primary or secondary storage.

For example, if the computer-storage media are implemented as semiconductor-based memory, software 632 may transform the physical state of the semiconductor memory when the program is encoded therein. For example, software 632 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

FIG. 7 illustrates an example block diagram of a microcontroller control board 700 such as the microcontroller control board 110 from FIG. 1.

In this example embodiment, microcontroller control board 700 includes processing circuitry 710 and storage system 720. Processing circuitry 710 is coupled with storage system 720 through link 701. Storage system 720 includes software 722 and data 724. Processing circuitry 710 is configured to produce a plurality of control signals 702 configured to control a plurality of pulse width modulators 731-736. In this example configuration, six pulse width modulators 731-736 are provided, however, other implementations may include any number of pulse width modulators.

Processing circuitry 710 comprises electronic circuitry configured to control pulse width modulators 731-736 to produce a plurality of power control signals, U-pos 112, V-pos 113, W-pos 114, U-neg 115, V-neg 116, and W-neg 117, as described above with respect to FIG. 1. Zero-vector module 740 monitors power control signals U-pos 112, V-pos 113, W-pos 114, U-neg 115, V-neg 116, and W-neg 117 and provides zero-vector signal 111 to pulse test control circuit 120 as shown in FIG. 1 and described above. In some embodiments, zero-vector module 740 comprises a NOR gate, and the zero-vector signal 111 is a logical NOR of some or all the power control signals, U-pos 112, V-pos 113, W-pos 114, U-neg 115, V-neg 116, and W-neg 117. Other embodiments may provide multiple zero-vector signals.

Processing circuitry 710 may comprise microprocessors and other circuitry that retrieves and executes software 722. Examples of processing circuitry 710 include general purpose central processing units, application specific processors, and logic devices, as well as any other type of processing device, combinations, or variations thereof. Processing circuitry 710 may be implemented within a single processing device, such as an application specific integrated circuit (ASIC), but may also be distributed across multiple processing devices or sub-systems that cooperate in executing program instructions.

Storage system 720 may comprise any non-transitory computer readable storage media capable of storing software 722 that is executable by processing circuitry 710. Storage system 720 may also include various data structures 724 which comprise one or more registers, databases, tables, lists, or other data structures. Storage system 710 may include volatile and nonvolatile, removable and non-removable media implemented in any method or technology for storage of information, such as computer readable instructions, data structures, program circuits, or other data.

Storage system 720 may be implemented as a single storage device but may also be implemented across multiple storage devices or sub-systems co-located or distributed relative to each other. Storage system 720 may comprise additional elements, such as a controller, capable of communicating with processing circuitry 710. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which may be used to store the desired information and that may be accessed by an instruction execution system, as well as any combination or variation thereof.

Software 722 may be implemented in program instructions and among other functions may, when executed by microcontroller control board 700 in general, or processing circuitry 710 in particular, direct microcontroller control board 700, or processing circuitry 710, to operate as described herein to produce a plurality of power control signals, U-pos 112, V-pos 113, W-pos 114, U-neg 115, V-neg 116, and W-neg 117, and zero-vector signal 111, (along with other functions not illustrated or described herein). Software 722 may include additional processes, programs, or components, such as operating system software, database software, or application software. Software 722 may also comprise firmware or some other form of machine-readable processing instructions executable by elements of processing circuitry 710.

In general, software 722 may, when loaded into processing circuitry 710 and executed, transform processing circuitry 710 overall from a general-purpose computing system into a special-purpose computing system customized to operate as described herein for a microcontroller control board 177 configured to produce a plurality of power control signals, U-pos 112, V-pos 113, W-pos 114, U-neg 115, V-neg 116, and W-neg 117, and zero-vector signal 111, (along with other functions not illustrated or described herein). Encoding software 722 on storage system 720 may transform the physical structure of storage system 720. The specific transformation of the physical structure may depend on various factors in different implementations of this description. Examples of such factors may include, but are not limited to the technology used to implement the storage media of storage system 720 and whether the computer-storage media are characterized as primary or secondary storage.

For example, if the computer-storage media are implemented as semiconductor-based memory, software 722 may transform the physical state of the semiconductor memory when the program is encoded therein. For example, software 722 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

FIG. 8 illustrates a flowchart of an example method for testing a safety circuit. In this example embodiment, pulse test control circuit 120 receives a zero-vector signal 111 from microcontroller control board 110, (operation 800). Pulse test control circuit 120 then generates a pulse test signal 118 when the zero-vector signal 111 is active, (operation 802).

First enable circuit 141 generates a first enable signal 145 which is active only when both the pulse test signal 118 and the first safety input signal 144 are inactive, (operation 804). Second enable circuit 131 generates a second enable signal 135 which is active only when both the pulse test signal 118 and the second safety input signal 134 are inactive, (operation 806).

Power signal gate 1 143 transfers a first plurality of power control signals to power module 150 when the first enable signal 145 is active, (operation 808). Power signal gate 2 133 transfers a second plurality of power control signals to power module 150 when the second enable signal is active, (operation 810). This removes the impact of pulse test signals on the PWM power control signals.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as relays, unless otherwise stated, are generally representative of any one or more elements configured to operate as a relay or switch. Such relay components include relays, contactors, and similar components.

Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same terminals. For example, a resistor or capacitor shown and described herein as a single component may instead be multiple resistors or capacitors, respectively, coupled in series between the same two terminals as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A safety test circuit, comprising:
a pulse test control circuit configured to receive a zero-vector signal and to generate a pulse test signal when the zero-vector signal is active;
a first safety channel, comprising:
   a first enable circuit configured to receive the pulse test signal and a first safety input signal, and to generate a first enable signal which is active only when both the pulse test signal and the first safety input signal are inactive; and
   a first power signal gate configured to receive a first plurality of power control signals and to transfer the first plurality of power control signals to a power module only when the first enable signal is active; and
a second safety channel, comprising:
   a second enable circuit configured to receive the pulse test signal and a second safety input signal, and to generate a second enable signal which is active only when both the pulse test signal and the second safety input signal are inactive; and
   a second power signal gate configured to receive a second plurality of power control signals and to transfer the second plurality of power control signals to the power module only when the second enable signal is active.

2. The safety test circuit of claim 1, wherein the zero-vector signal is active when the first plurality of power control signals and the second plurality of power control signals are all at a logical zero.

3. The safety test circuit of claim 2, wherein the zero-vector signal is a logical NOR of all the first plurality of power control signals and the second plurality of power control signals.

4. The safety test circuit of claim 1, wherein the first power signal gate is also configured to receive an input coupled to a logical one, and to generate a first confirmation signal, wherein the first confirmation signal is a logical one while the first enable signal is active, and a logical zero while the first enable signal is inactive, and the second power signal gate is also configured to receive an input coupled to a logical one, and to generate a second confirmation signal, wherein the second confirmation signal is a logical one while the second enable signal is active, and a logical zero while the second enable signal is inactive.

5. The safety test circuit of claim 4, wherein the first safety channel further comprises a first diagnostic circuit configured to receive the first confirmation signal, and to transmit a first error signal to the first enable circuit when the first confirmation signal is a logical one and the first enable signal is inactive, and the second safety channel further comprises a second diagnostic circuit configured to receive the second confirmation signal, and to transmit a second error signal to the second enable circuit when the second confirmation signal is a logical one and the second enable signal is inactive.

6. The safety test circuit of claim 5, wherein the safety test circuit is configured to shut down the power module when either the first or second error signal is active.

7. The safety test circuit of claim 1, wherein the first and second power signal gates each comprise a plurality of logical AND gates.

8. The safety test circuit of claim 1, wherein the power module is configured to supply power to an industrial machine.

9. The safety test circuit of claim 1, wherein the safety test circuit is implemented in an application specific integrated circuit.

10. The safety test circuit of claim 1, wherein the pulse test control circuit is also configured to generate a pulse test signal when the zero-vector signal has remained inactive for longer than a test threshold time period.

11. The safety test circuit of claim 1, wherein the zero-vector signal is generated by a microcontroller.

12. A method for testing a safety circuit comprising:
receiving a zero-vector signal;
generating a pulse test signal when the zero-vector signal is active;
generating a first enable signal which is active only when both the pulse test signal and a first safety input signal are inactive;
generating a second enable signal which is active only when the pulse test signal and a second safety input signal are inactive;
transferring a first plurality of power control signals to a power module when the first enable signal is active; and
transferring a second plurality of power control signals to the power module when the second enable signal is active.

13. The method of claim 12, wherein the zero-vector signal is active when the first plurality of power control signals and the second plurality of power control signals are all at a logical zero.

14. The method of claim 13, wherein the zero-vector signal is a logical NOR of all the first plurality of power control signals and the second plurality of power control signals.

15. The method of claim 12, further comprising:
receiving an input coupled to a logical one in a first power signal gate;
generating a first confirmation signal from the logical one in the first power signal gate, wherein the first confirmation signal is a logical one while the first enable signal is active, and a logical zero while the first enable signal is inactive;
receiving an input coupled to a logical one in a second power signal gate; and
generating a second confirmation signal from the logical one in the second power signal gate, wherein the second confirmation signal is a logical one while the second enable signal is active, and a logical zero while the second enable signal is inactive.

16. The method of claim 15, further comprising:

generating a first error signal for the first power signal gate when the first confirmation signal is a logical one and the first enable signal is inactive; and generating a second error signal for the second power signal gate when the second confirmation signal is a logical one and the second enable signal is inactive.

17. The method of claim 16, further comprising:

shutting down the power module when either the first or second error signal is active.

18. The method of claim 15, wherein the first and second power signal gates each comprise a plurality of logical AND gates.

19. The method of claim 12, wherein the power module is configured to supply power to an industrial machine.

20. The method of claim 12, further comprising:

generating a pulse test signal when the zero-vector signal has remained inactive for longer than a test threshold time period.

\* \* \* \* \*